United States Patent [19]
Martin et al.

[11] Patent Number: 4,639,972
[45] Date of Patent: Feb. 3, 1987

[54] THIGH DEBONER

[75] Inventors: Eugene G. Martin, New Holland; Dale M. Risser, Denver, both of Pa.

[73] Assignee: Favorite Manufacturing, Inc., New Holland, Pa.

[21] Appl. No.: 747,844

[22] Filed: Jun. 24, 1985

[51] Int. Cl.[4] .................. A22C 17/04; A22C 21/00
[52] U.S. Cl. ....................................... 17/11; 17/46
[58] Field of Search ............ 17/1 G, 11, 12, 46, 17/56, 60, 61, 62, 63

[56] References Cited

U.S. PATENT DOCUMENTS

| 3,890,674 | 6/1975 | Fradin. | |
|---|---|---|---|
| 3,902,222 | 9/1975 | Hartmann. | |
| 3,908,230 | 9/1975 | Hartmann. | |
| 3,930,282 | 1/1976 | Martin et al. | |
| 3,982,299 | 9/1976 | Kompan. | |
| 4,020,528 | 5/1977 | Lindbladh et al. | 17/62 X |
| 4,270,243 | 6/1981 | Lewis. | |
| 4,306,335 | 12/1981 | Hawk et al. | |
| 4,312,100 | 1/1982 | Sink. | |
| 4,327,463 | 5/1982 | Martin. | |
| 4,359,807 | 11/1982 | Adkison et al. | 17/1 G X |
| 4,373,232 | 2/1983 | Harding et al. | |
| 4,402,112 | 9/1983 | Gasbarro. | |
| 4,488,332 | 12/1984 | Atteck et al. | |
| 4,557,017 | 12/1985 | Gasbarro | 17/11 |

Primary Examiner—Willie G. Abercrombie
Attorney, Agent, or Firm—Price, Heneveld, Cooper, DeWitt & Litton

[57] ABSTRACT

An apparatus for removing the meat from an elongated poultry bone, such as a thigh piece, includes an elongated frame and a housing which defines a feed end and a discharge end. An elongated conveyor is supported on the frame and extends from the feed end to the discharge end. A hold-down rail is supported by the housing for parallel movement towards and away from the conveyor to hold the bone in engagement with the conveyor for movement thereby. A scraper is positioned to engage the meat and the bone as it passes along the hold-down assembly. A water knife is positioned downstream of the scraper. The knife is biased into engagement with the thigh piece and discharges a high pressure water stream onto the piece to peel the meat down from the bone. A plate assembly defining a slot is positioned downstream of the hold-down rail. The bone passes through the slot and is progressively wiped by the plate assembly. A cutting assembly is positioned downstream from the plate assembly for cutting the meat from the lower edge of the bone.

38 Claims, 17 Drawing Figures

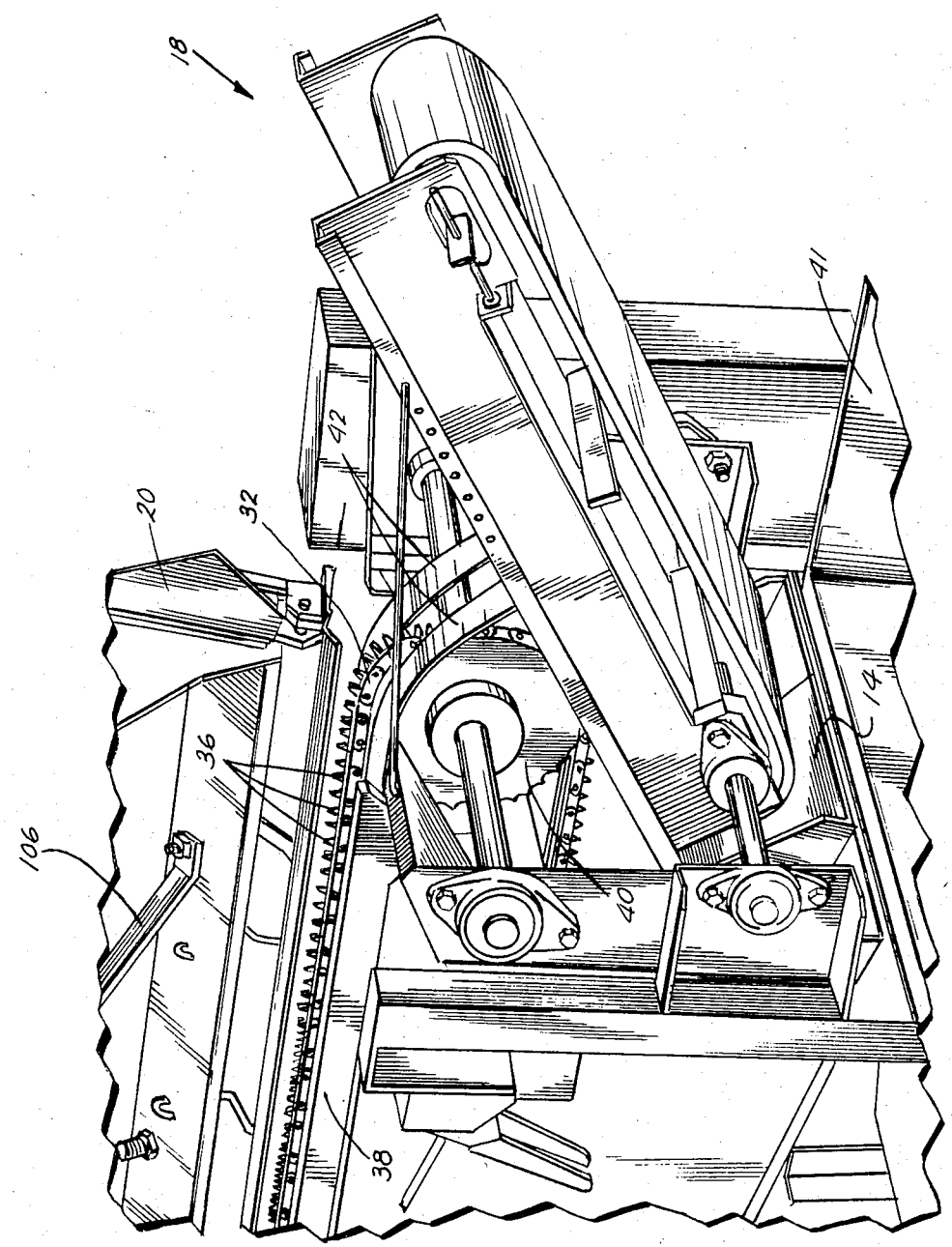

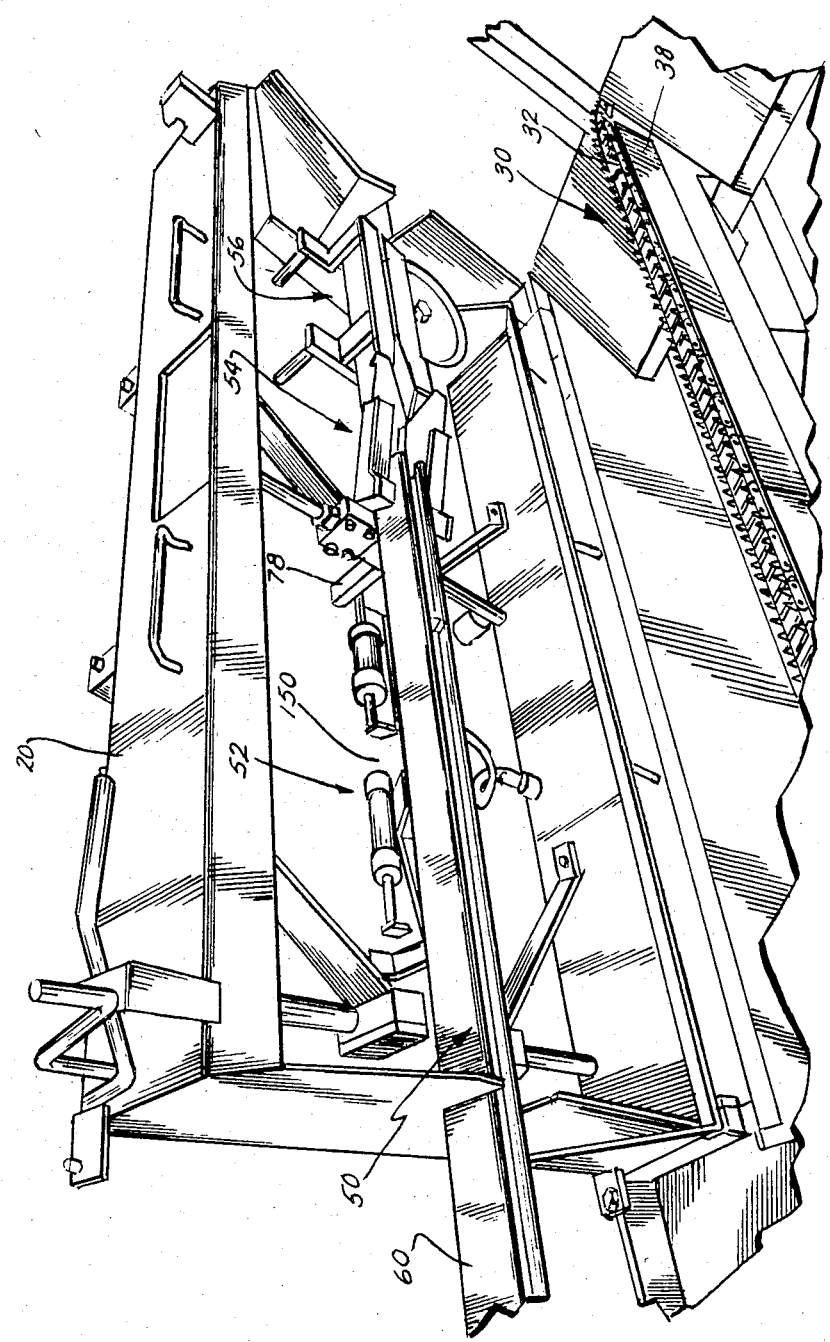

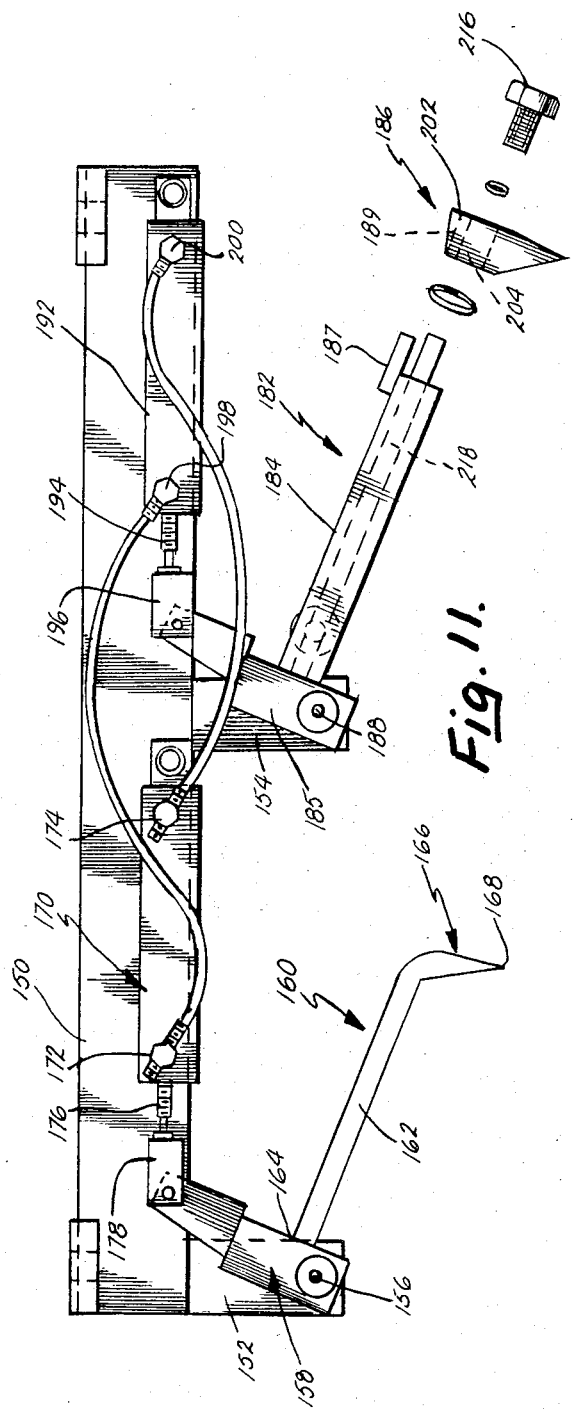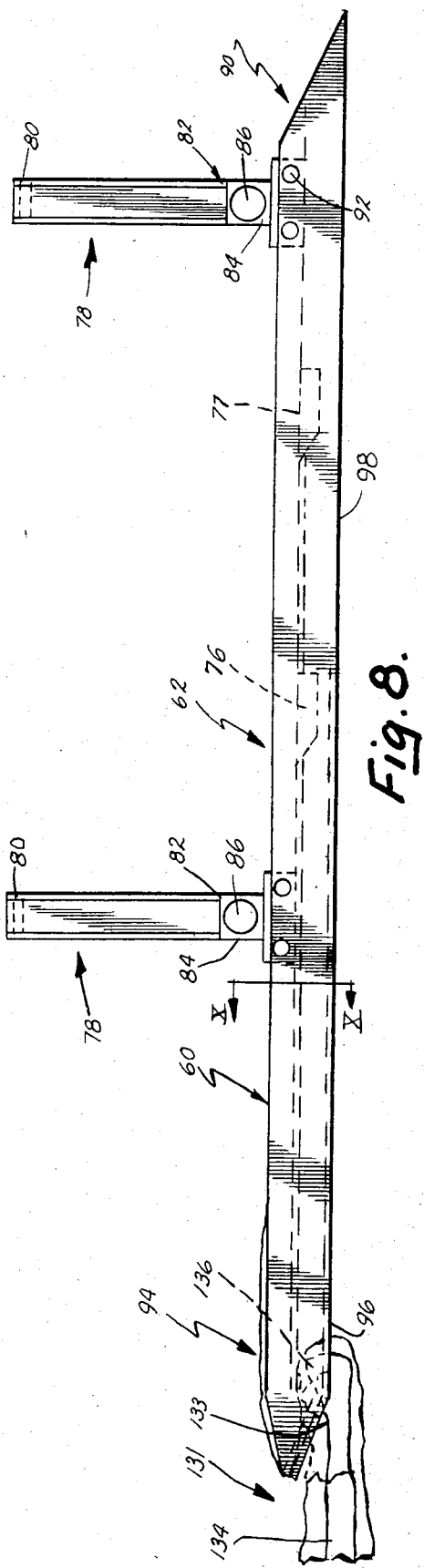

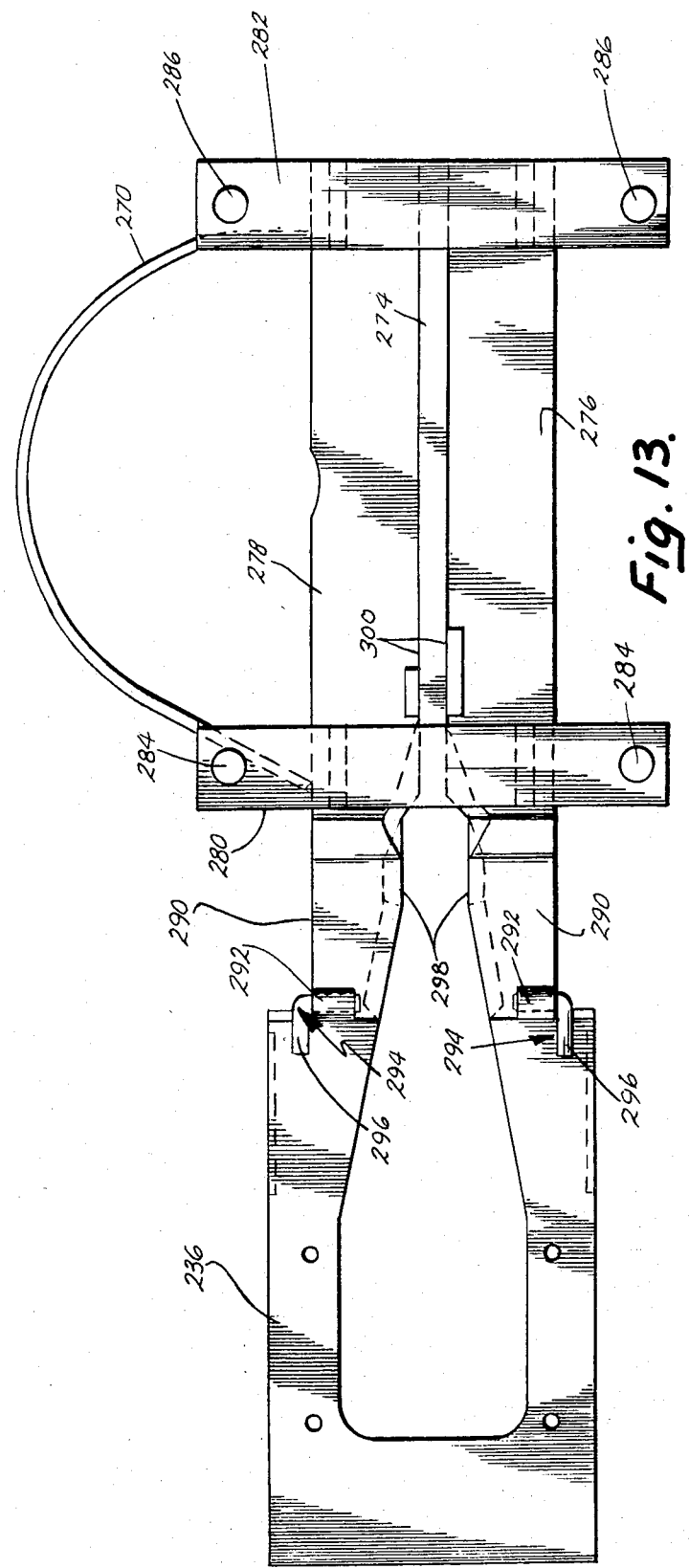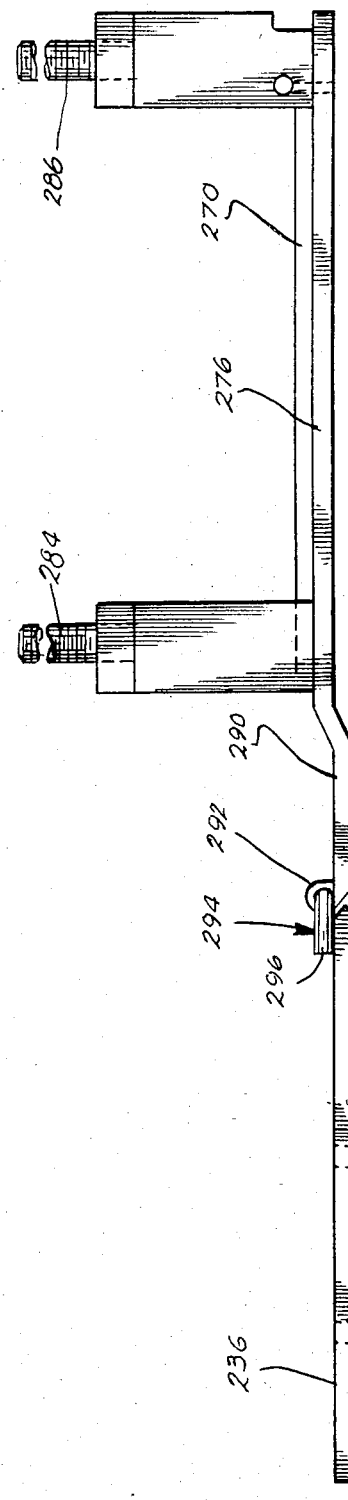

THIGH DEBONER

CROSS REFERENCE TO RELATED APPLICATON

This application is related to application Ser. No. 570,914, entitled THIGH DEBONER, filed on Jan. 16, 1984.

BACKGROUND OF THE INVENTION

The present invention relates to apparatus for deboning poultry pieces and more particularly to a unique apparatus for removing the meat from an elongated bone of a poultry thigh piece, leg and the like.

Various methods and machines have been used to separate an eviscerated poultry carcass into its various component pieces or parts for subsequent processing, packaging and sale. The separating operations typically involve removal of the meat components from the carcass. Such cut-up and deboning operations have been and continue to be performed by hand.

In order to increase productivity and reduce costs, manual operations have been replaced by various automatic cut-up and deboning machines. For example, U.S. Pat. No. 4,385,421, entitled POULTRY LEG/BACK PROCESSOR, issued on May 31, 1983, to Eugene G. Martin discloses an apparatus for automatically separating the poultry leg sections from the back of the carcass. After removal of the leg sections, the meat, if desired, is stripped from the bone by a subsequent deboning operation.

Various machines have been developed fro deboning poultry legs, thighs and the like. One example may be found in U.S. Pat. No. 4,327,463, entitled SINGLE STATION ANATOMICAL SECTION DE-BONING MACHINE, issued on May 4, 1982, to Eugene G. Martin. The machine disclosed in this patetn includes a girpper blade assembly which engages an end of the bone and a set of blades through which the bone is pulled. The apparatus, in effect, pulls the bone out of the meat portion or peels the meat back along the longitudinal axis of the bone.

Another approach to deboning poultry parts may be found in U.S. Pat. No. 4,402,112, entitled AUTOMATIC POULTRY DEBONING APPARATUS, issued on Sept. 6, 1983, to Gasbarro. The apparatus disclosed therein employs a ring-like array of high pressure fluid streams to separate the meat from the bone portion of a poultry leg and thigh. The streams are disposed along the path of travel of a conveyor and impinge upon the leg or thigh portion to remove the meat.

The apparatus disclosed in the cross referenced, related application referred to above includes a conveyor for moving the poultry piece along a longitudinal axis. A peel-down assembly extends along the conveyor and defines a passage or slot through which the piece passes. The meat is peeled or folded along the sides of th ebone until the meat is secured to the bone principally along the lower longitudinal edge thereof. A cutting assembly positioned downstream from the peel-down assembly severs the meat from the bone along this longitudinal edge. Scraper knives and scoring knives are positioned along the conveyor to assist in separation of the meat from the bone.

A need exists for an improved deboning apparatus which readily accommodates different types of poultry, such as chicken or turkey, while readily adjusting for different size parts. Desirably, an improved apparatus would be of reduced complexity from the prior machines while achieving improved yield or removal of meat from the bone and eliminating problems heretofore experienced with excessive water absorption and the like.

SUMMARY OF THE INVENTION

In accordance with the present invention, a unique apparatus is provided for removing the meat from an elongated bone on a continuous basis. Essentially, the apparatus includes a conveyor for moving the poultry part along its longitudinal axis. Provision is made for scraping the poultry part along a top surface while initially separating the meat from the bone. A water knife subassembly is provided for impinging the meat with a highly concentrated, high pressure stream of fluid as it progresses along the conveyor. Provision is made for biasing a hold-down assembly, the scraper and the water knife into engagement with the poultry part and for automatically positioning the elements of the apparatus to accommodate different size parts.

In narrower aspects of the invention, a finish peel-down assembly is included which removes the meat along the lateral sides of the bone. The poultry part then engages a ramp assembly which defines a slot through which the peeled down meat passes. The meat is severed by a rotary cutting blade which overlies the slot between the bone and the top surface of the ramp.

The apparatus automatically adjusts for different size poultry parts, effectively removes the meat from the bone and is of reduced complexity from the prior approaches.

BRIEF DESCRIPTION OF THE DRAWINGS

FIG. 4 is a perspective view of the discharge end of the apparatus;

FIG. 5 is an enlarged, perspective view showing the hold-down rail and mounting arrangement and the scraper and water knife subassembly;

FIG. 8 is a side, elevational view of the hold-down rail;

FIG. 11 is a side, elevational view of the scraper and water knife subassembly;

FIG. 13 is a top, plan view of the final peel-down and ramp plate subassembly;

FIG. 14 is a side, elevational view of the subassembly of FIG. 13;

DETAILED DESCRIPTION OF THE PREFERRED EMBODIMENT

Figure 1:
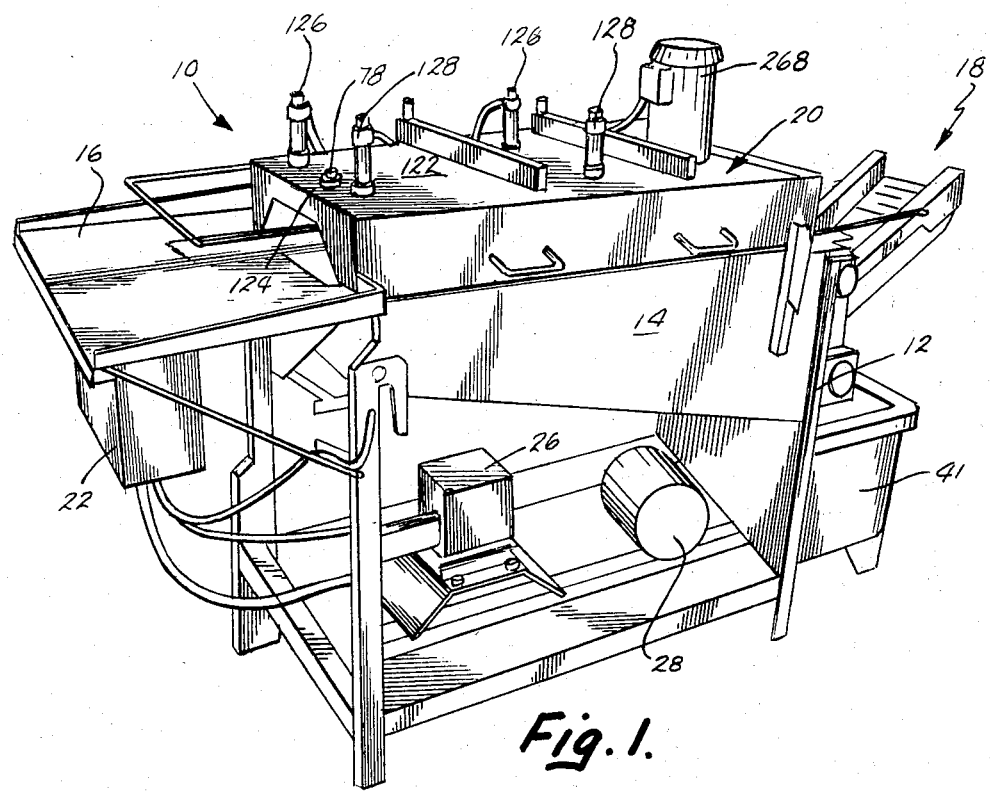
FIG. 1 is a side, perspective view of the deboning apparatus in accordance with the present invention illustrating the frame, the housing or top, the infeed end and the discharge end.
Figure 2:
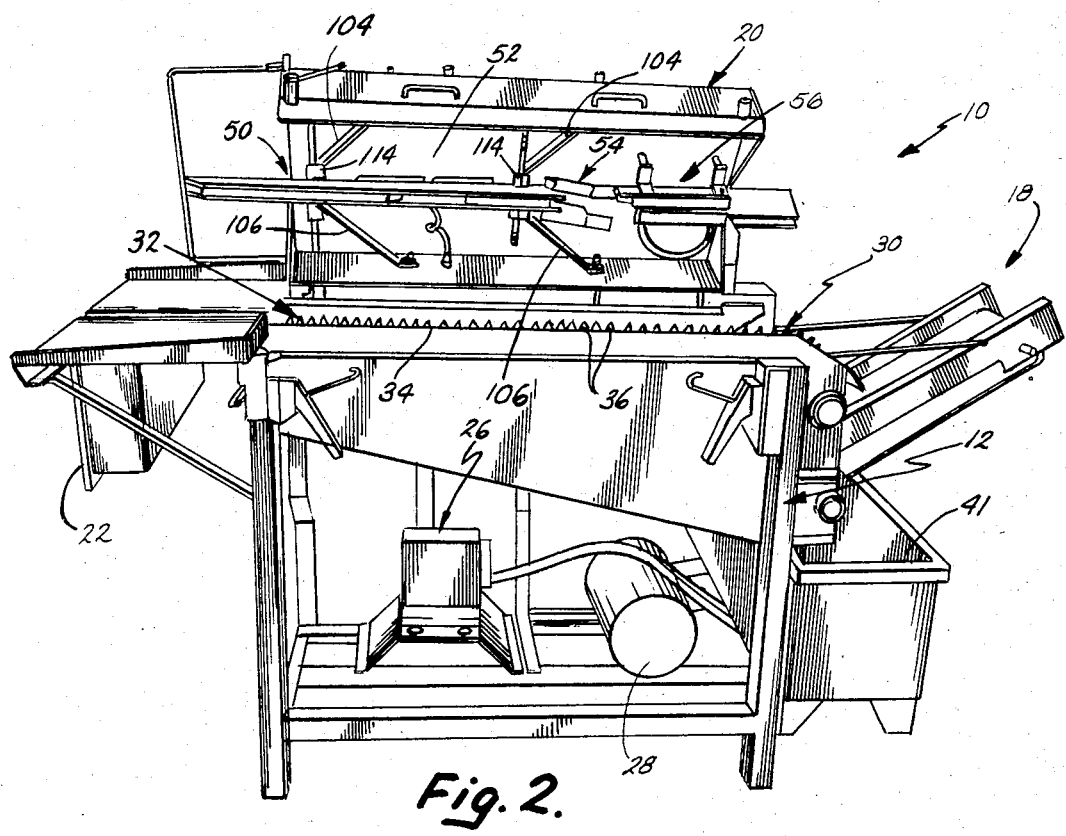
FIG. 2 is a side, perspective view of the apparatus with the housing raised to show the hold-down subassembly, the final peel-down subassembly, the cutting subassembly and the scraper and washer knife subassembly.

A preferred embodiment of the poultry part deboner apparatus in accordance with the present invention is illustrated in FIGS. 1 and 2 and generally designated 10. Apparatus 10 includes a frame 12 supporting a catch pan 14, an infeed table 16 and a discharge conveyor 18. Pivotally mounted to a lateral edge of frame 12 is an upper housing or cover 20. Housing 20 is illustrated as pivoted along one side and it is movable from a closed or operative postion illustrated in FIG. 1 to an open or service position illustrated in FIG. 2. In the alternative, housing 20 may be pivoted from its rear end. A suitable control panel 22 is mounted below the infeed table. The system further includes a suitable fluid pump and manifold subassembly 26 supported on the frame and a high pressure water pump motor 28.

Figure 3:
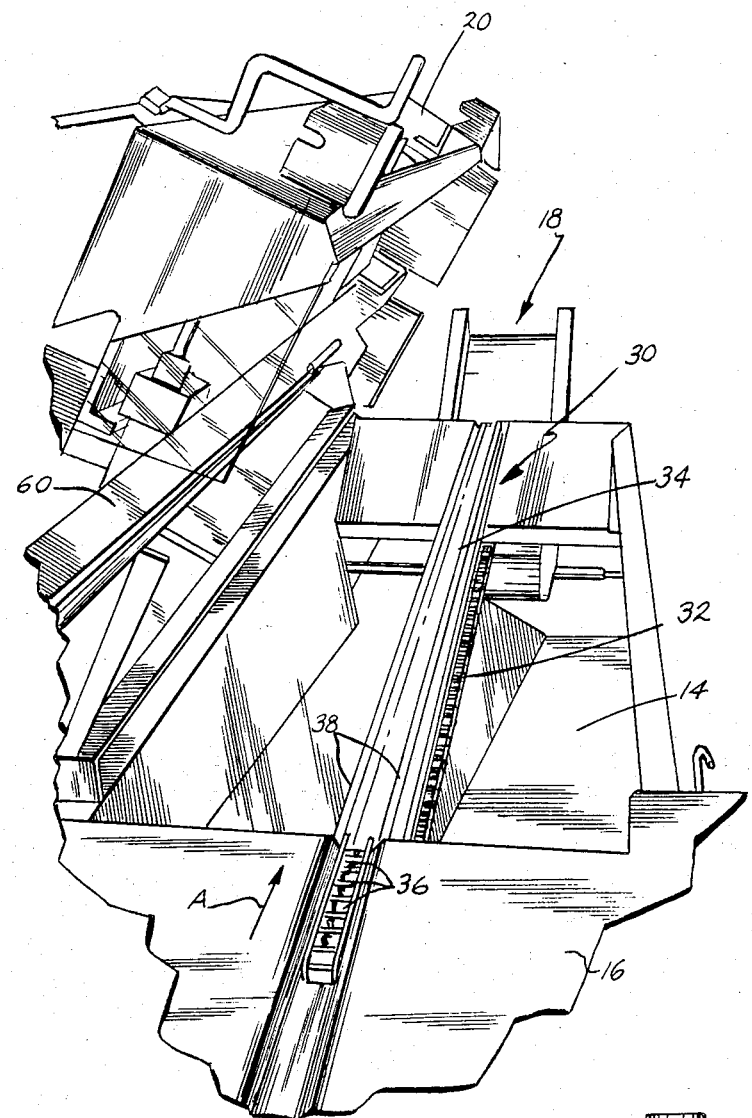
FIG. 3 is a perspective view from the infeed end of the apparatus of FIG. 2 showing the conveyor means included in the present invention.

A conveyor subassembly 30 extends longitudinally of frame 12 from the infeed end to the discharge end. Conveyor 30 includes an endless chain 32 which defines an upper run 34. Conveyor chain 32 includes a plurality of generally V-shaped dogs 36 which engage the poultry part and move it along the longitudinal axis of the frame and through the apparatus. As seen in FIG. 3, catch pan 14 extends along the frame on either side of the conveyor. In addition, the conveyor includes a chain guide 38. Guide 38 is preferably formed from a U.S.D.A. approved ultra-high molecular weight plastic. As seen in FIG. 4, conveyor chain 32 extends around sprockets 40 supported on the frame structure. The chain is driven by a suitable motor (not shown) so that upper run 34 moves in the direction of arrow A (FIG. 3). The basic conveyor structure is also disclosed in related application U.S. Ser. No. 570,914, filed Jan. 16, 1984. To the extent necessary, said related application is hereby incorporated by reference.

Also, as seen in FIGS. 3 and 4, catch pan 14 is angled downwardly towards the discharge end of the apparatus. As explained in more detail below, meat fragments and water removed from the poultry part will slide into a bin 41 at the discharge end. The meat with bone removed is removed from the conveyor chain 30 by guides 42 and deposited on the bone discharge conveyor 18.

Cover or housing 20, as seen in FIGS. 2 and 5, for example, supports a hold-down rail subassembly 50, a scraper and water knife subassembly 52, a final peel-down subassembly or squeegee 54 and a cutting subassembly 56. As the poultry piece passes through the apparatus, the meat is removed from the bone by these subassemblies.

Hold-Down Subassembly

Figure 10:
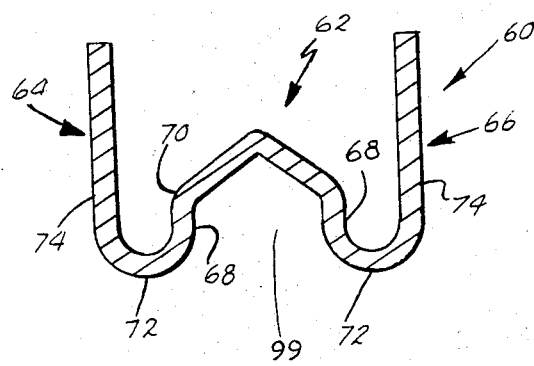
FIG. 10 is a cross-sectional view taken along line X—X of FIG. 8.
Figure 9:
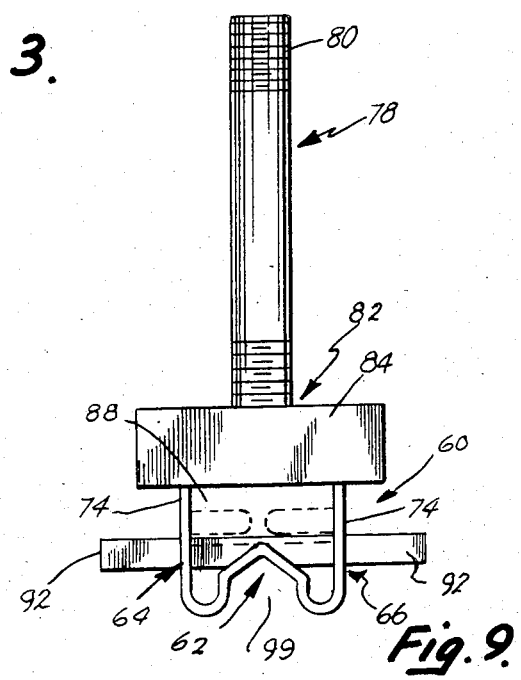
FIG. 9 is an end, elevational view of the hold-down rail.

The hold-down subassembly 50 is best seen in FIGS. 5, 6, 8, 9, 10 and 12. Subassembly 50 includes an elongated hold-down rail 60. Hold-down rail 60, as seen in FIGS. 8, 9 and 10, includes a central portion 62 and side portions 64, 66. Central portion 62 has a generally inverted V-shape in vertical cross section. Side portions 64, 66 are generally U- or J-shaped in cross section and include a leg 68 joined to a leg 70 of central portion 62, a curved base 72 and an upwardly extending leg 74. Central portion 62 of rail 60 defines a scraper notch or opening 76 and a water knife notch or opening 77.

Secured to the sidewalls or legs 74 of rail 60 are a pair of longitudinally spaced support rods 78. Each rod 78 includes an externally threaded upper portion 80. Each rod 78 is joined to a base 82 which includes a transversely positioned bearing structure 84 defining a throughbore 86. Each support rod 78 is secured to legs 74 by suitable fasteners passing through the legs and into a tapped lower boss 88 (FIG. 9). Secured to the trailing end 90 of bar 60 are squeegee support pins 92. Pins 92 extend outwardly perpendicular to the sidewalls of rail 60. Rail 60 further includes a leading or front end portion 94. As illustrated in FIG. 8, a lower edge 96 of portion 94 is angled upwardly with respect to edge 98 of the main portion of rail 60. Rail 60 defines a center passage, slot or V-shaped groove 99 which retains the poultry piece and guides the piece through the apparatus.

Figure 6:
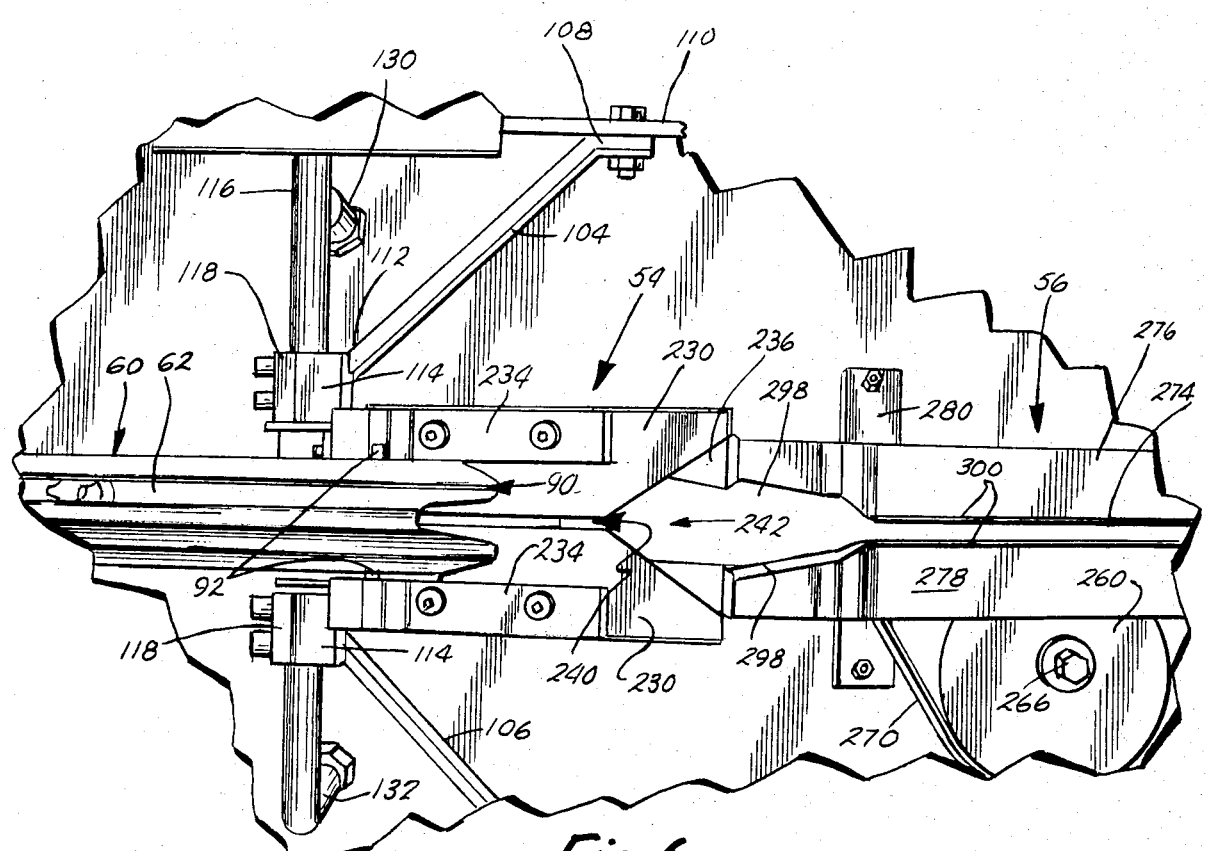
FIG. 6 is an enlarged, bottom view showing a portion of the hold-down rail, the final peel-down subassembly and a portion of the cutting subassembly.

Hold-down rail 60 is supported on cover 20 by a parallelogram linkage. As seen in FIGS. 2 and 6, a pair of links 104, 106 are positioned adjacent each end of rail 60. Link 104 is pivoted at an end 108 to a side 110 of cover 20. An opposite end 112 is joined to a bearing structure 114. An elongated, generally cylindrical rod 116 extends through throughbore 86 of the mounting bar subassembly 78. A closure plate 118 secures end 112 to bar 116. Links 104, 106 support the hold-down rail for parallel movement towards and away from conveyor 30. Slot 99 of the hold-down rail extends along and immediately above the conveyor.

As seen in FIG. 1, support shafts 78 extend through a top portion 122 of cover 20. Nuts 124 threaded to rod 78 act as stops to limit the downward movement of the rail. A plurality of double-acting piston cylinder actuators 126, 128 are also supported on top portion 122 of cover 20. As seen in FIG. 6, an actuator rod 130 of acutator 126 abuts bar 116, and an actuator rod 132 of actuator 128 abuts rod 116 at the opposite end thereof. The double-acting piston cylinder actuators bias rail 60 towards the chain in a positive fashion. Actuators 126, 128 are connected by suitable tubing to manifolds on the top of cover 20 and a source of pressurized air (not shown). The actuators bias the rail towards the conveyor and into engagement with the poultry piece. The aggressiveness or force exerted on the poultry piece will be controlled by actuators 126, 128.

As schematically illustrated in FIG. 8, a poultry part, such as a turkey thigh piece, 131 is fed into the machine with a small end 133 of bone 134 being inserted into the inverted V-shaped groove or slot 99 defined by rail 60. The so-called white knuckle 136 of the small end is positioned to extend outwardly into the inverted V-shaped slot. Rail 60 holds the piece in engagement with the conveyor so that it moves through the machine. Also, as the piece enters the machine, it is engaged by the legs 68 of the side portions 64, 66 and meat is initially forced down along the lateral sides of the bone due to the vertical pressure exerted on the part by the rail. Rail 60 may float or move vertically to accommodate different size poultry pieces. The floating nature of the rail through the use of what in effect is a controllable air spring increases productivity and eliminates the need for manual adjustment of the rail with respect to the conveyor.

Scraper and Water Knife Subassembly

Figure 12:
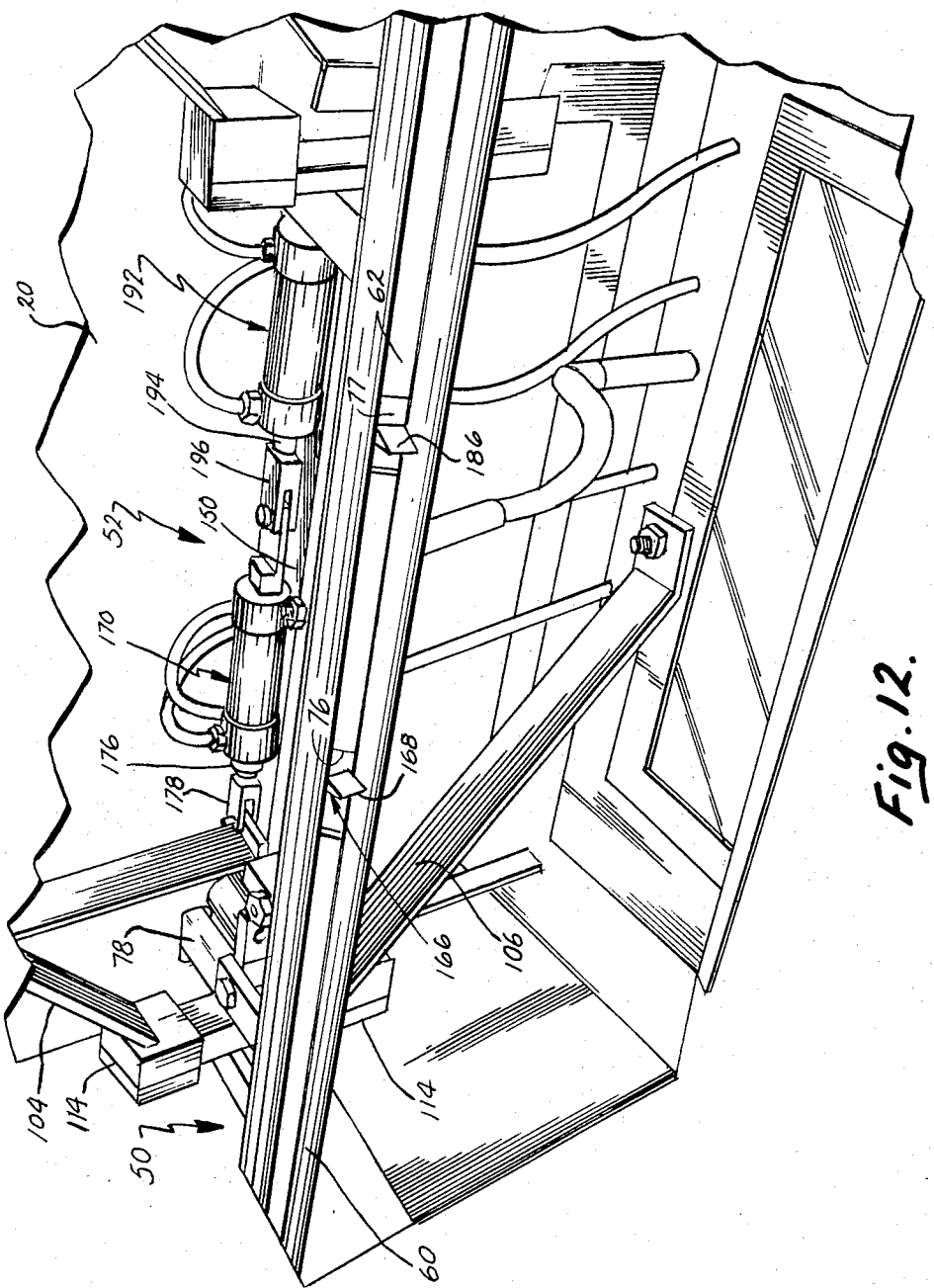
FIG. 12 is a bottom, perspective view showing the hold-down rail and the scraper and water knife subassembly.

Scraper and water knife subassembly 52 is illustrated in FIGS. 5, 11 and 12. As best seen in FIG. 11, the scraper and water knife subassembly includes a support rod or bar 150. Bar 150 includes a pair of longitudinally spaced, depending support members 152, 154. Support member 152 includes a pivot 156 on which a connecting link 158 is pivotally mounted. Extending perpendicular from link 158 and toward the discharge end of the apparatus is a generally L-shaped scraper 160. Scraper 160 includes an elongated portion 162 having an end 164 secured to link 158 and a depending scraper portion 166 having an edge 168. As seen in FIGS. 5 and 12. bar 150 is secured to cover 20 so that portion 166 of scraper 160 may extend downwardly through the notched opening 76 of rail 60 immediately above conveyor 30. Scraper 160 is pivotal between a raised, inoperative position and a lowered, operative position illustrated in FIG. 12 by a double-acting fluid piston cylinder actuator 170. Actuator 170 includes an inlet/outlet 172 connected to a high pressure fluid manifold and a second inlet/outlet 174 which is connected to a scraper fluid manifold. A piston rod 176 of actuator 170 is operably connected to link 158 by a block 178. Piston cylinder actuator 170 also acts as a fluid spring to control the force exerted by edge 168 of scraper 160 on the poultry part. The poultry piece moves through the hold-down rail and is engaged by the scraper along its upper surface. The scraper loosens the meat from the bone.

Figure 15:
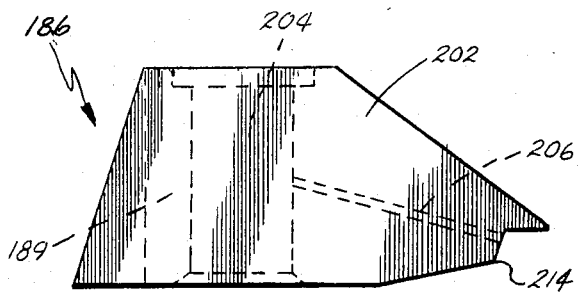
FIG. 15 is a side, elevational view of the water knife nozzle.
Figure 17:
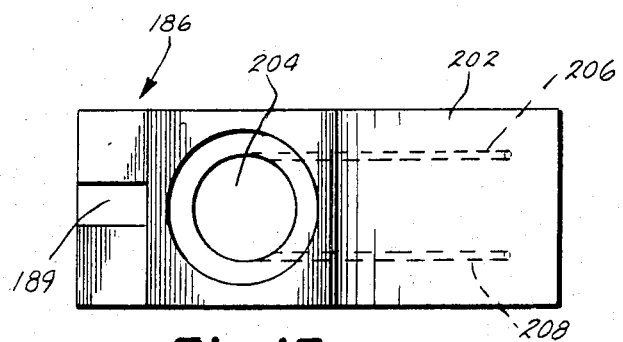
FIG. 17 is a top, plan view of the water knife nozzle.
Figure 16:
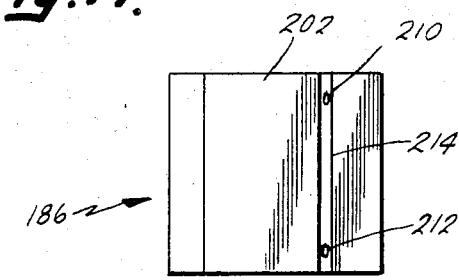
FIG. 16 is a front end view of the water knife nozzle.

After the part passes by the scraper subassembly, it comes into contact with a water knife 182. Water knife 182 includes an elongated support rod 184 supporting a water nozzle 186 at the free end thereof. Rod 184 is secured to a pivot link 185 rotatably mounted about a pivot point 188 on support 154. Nozzle 186 is keyed to rod 184 by a key 187 disposed in slot 189 (FIGS. 11, 15 and 17). Rod 184 and nozzle 186 are moved towards and away from conveyor 30 by a double-acting piston cylinder actuator 192. Piston rod 194 of actuator 192 is pivotally connected to an upper end of link 185 by a block 196. Inlets 198, 200 of actuator 192 are ganged to the scraper manifold and the high pressure manifold to work in conjunction with the scraper piston cylinder actuator 170.

As seen in FIGS. 11, 15, 16 and 17, nozzle 186 includes a body 202. Body 202 defines an inlet bore 204. Nozzle passages 206, 208 extend from bore 204 to nozzle outlets 210, 212 at edge 214 of body 202. Nozzle 186 is secured to a free end of rod 184 by a suitable nozzle bolt 216. Rod 184 defines a fluid pasage 218 which is connected to a source of water. In one form, the nozzle outlets 210, 212 have a diameter of approximately 0.025 inch and when connected to a source of water (such as pump 26) emit a high pressure stream of fluid. Due to the positioning of the nozzle outlets 210, 212 adjacent the sides of body 202, the water streams will impinge the poultry piece at an angle towards the inlet end of the apparatus and from above along the lateral edges thereof. As seen in FIG. 12, actuator 192 positions the nozzle so that it extends through the opening or notch 77 defined by rail 60. The two high pressure streams in conjunction with the edge 214 in contact with the poultry part further peel down the meat from the bone.

Piston cylinder actuator 192 controls the aggressiveness or force that the nozzle exerts on the poultry piece as it passes within the channel defined by rail 60.

Final Peel-Down Subassembly

As seen in FIGS. 5 and 6, after the poultry piece passes the water knife, it is engaged by a final peel-down subassembly 54. Peel-down subassembly 54 includes squeegee plates 230. Mounting plates 234 fasten squeegee plates 230 to a support plate 236. Plate 236 is shown in FIGS. 13 and 14. Mounting plates 234 and support 236 clamp around the squeegee support pins 92 on rail 60. The trailing edge 90 of rail 60 is angled downwardly to engage the undersurface of squeegee plates 230 and hence properly position the plate with respect to the rail, the conveyor and the poultry piece. Plates 230 defines an elongated slot 240 which terminates in an enlarged portion 242. As described in more detail in the aforementioned related application, the squeegee plate subassembly wipes the meat from the bone. As the poultry part passes through the slot 240, the lateral edges of the plate which define the slot move along the lateral sides of the poultry part in a wiping or peeling fashion.

Plates 230 are formed of a plastic material, such as urethane. Each plate peels or folds down the meat by wiping the bone in a manner similar to that of a squeegee.

Cutting Subassembly

Figure 7:
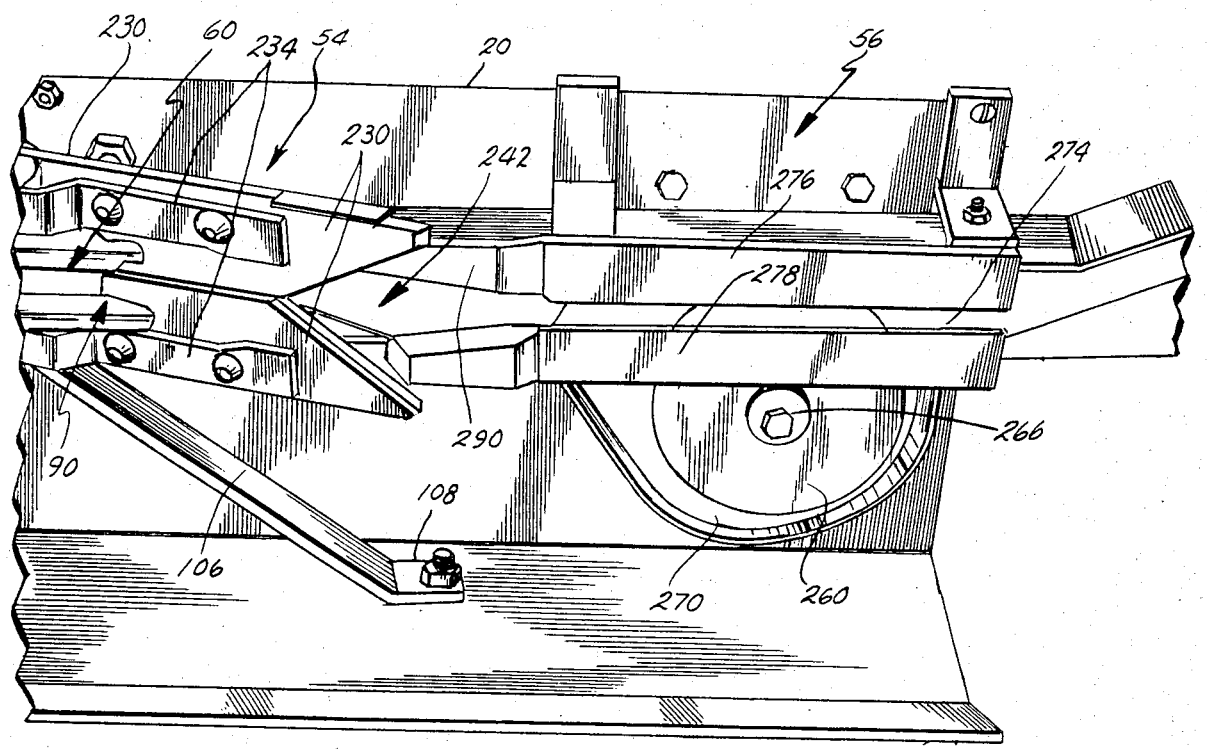
FIG. 7 is a bottom, perspective view showing the final peel-down subassembly and the cutting subassembly.

After passing through the final peel-down subassembly 54, the poultry part will have the meat folded down along the lateral edges of the bone until it is retained on the bone principally along the lower longitudinal edge of the bone. The meat retained on the bone will overlie both sides of the upper run of the conveyor. The poultry part then enters the cutting subassembly 56 of the apparatus. Subassembly 56 is best seen in FIGS. 7, 13 and 14. Subassembly 56 includes a rotary cutter blade 260 fixed to a drive shaft 266 of a motor 268. As seen in FIG. 1, motor 268 is secured to the top of cover 20. A blade guard 270 is positioned around blade 260. Blade 260 is supported so that it overlies an elongated guide slot 274 defined by a pair of ramp plates 276, 278. Plates 276, 278 are secured to a forward cross member 280 and a rearward cros member 282. Extending from the tops of the cross members are support rods 284, 286. Support rods 284, 286 extend through the top surface of cover 20 and secure the ramp plates 276, 278 in their proper position.

Each ramp plate 276, 278 includes a forward, stepped down portion 290. Portion 290 includes hinge housings 292 which receive a hinge pin 294. Pins 294 include a portion 296 secured to the trailing edge of squeegee support 256. Portions 290 insure that the ramp plates are properly positioned to receive the bone of the poultry piece after it passes through the final peel-down subassembly.

When in position in the apparatus guide, slot 274 overlies the longitudinal centerline of chain 32. Each of the plates 276, 278 includes beveled leading edges 298 which extend along the lateral edge 300 and into the leading or opening portion of guide slot 274. When the cutting assembly is in position overlying the chain, the poultry piece is moved into engagement with the ramp plates so that the bone is forced along the top surface of the plates. The folded down or peeled down meat is forced through the guide slot 274. Blade 260 overlies guide slot 274 and is positioned beneath the bone of the poultry piece. The rotary cutting blade severs the meat from the bone as it passes across plates 276, 278. The conveyor dogs in engagement with the meat force the bone through the cutting subassembly. The bone and meat are conveyed by the conveyor chain 32 to the discharge conveyor.

Overall Operation

In view of the foregoing description, the operation of the deboner in accordance with the present invention should be readily apparent to one of ordinary skill in the poultry processing art. The deboner, while principally developed to remove meat from an elongated turkey thigh bone, would be usable to remove meat from other elongated poultry parts, including drumsticks, chicken parts and the like.

In use, the conveyor chain drive is activated at control panel 22. The thigh piece is positioned on the infeed table with the white knuckle up. The piece is inserted into the inverted V-shaped passage 98 defined by the hold-down rail 60. Dogs 36 of conveyor chain 32 engage the poultry piece transported through the hold-down assembly. As the piece moves through the inverted V-shape grovoe or slot 99 which is forced into engagement with the piece by the piston cylinder actuators 126, 128, initial peeling down or loosening of the meat is achieved. The part then moves into contact with scraper edge 168 which is biased into engagement with the meat through slot 76 by the piston cylinder actuator 170. Scraper edge 168 scrapes along the top surface of the bone further loosening the meat. After passing by the scraper, the piece encounters the water knife. Nozzle 186 is biased into engagement with the piece by piston cylinder actuator 192 through hole 77. Edge 214 of the nozzle body engages the poultry piece and two high pressure streams of water are emitted from nozzle openings 210, 212. The water knife further peels down, cuts or removes the meat along the lateral edges of the bone.

After passing by the water knife, the knuckle passes through the enlarged slot 242 of the final peel-down or squeegee subassembly. Due to the configuration of the slot, the edges of the squeegee engage the bone at an angle with respect to horizontal and wipe or peel down the meat from the bone.

After passing through the squeegee subassembly, the bone is ramped onto the top surface of ramp plates 276, 278. The meat which is retained on the bone along the lower longitudinal edge thereof is forced through the guide slot 274. Rotary cutting blade 260 severs the meat from the bone.

The deboner in accordance with the present invention efficiently removes the meat from an elongated poultry piece. The portion of the bone which is fed into the machine in effect guides or stabilizes the part as it moves through the machine. The white knuckle and trailing end of the bone are contacted and retained by the hold-down rail assembly. The floating support and linkage arrangement for the hold-down rail and the forward edge of the squeegee subassembly readily adjust the apparatus to poultry pieces of different size. Further, the force exerted on the piece is readily controllable by the operator for maximum meat removal. The two high pressure streams of water emitted by the nozzle are positioned to maximize meat removal without danger of excessive water retention by the meat. The apparatus is of reduced complexity when compared to prior art deboning machines. The hold-down rail, the scraper and water knife, the final peel-down assembly and cutting assembly are all supported by the pivotal housing. The operative elements of the apparatus are, therefore, easily accessed for service and cleaning. This represents a significant improvement and substantially increases the ease of use of the apparatus.

In view of the foregoing description, those of ordinary skill in the art will undoubtedly envision various modifications to the present invention which will not depart from the scope thereof. It is expressly intended, therefore, that the true spirit and scope of the present invention should be determiend by reference to the appended claims.

The embodiments of the invention in which an exclusive property or privilege is claimed are defined as follows:

1. A deboner apparatus for removing meat from an elongated poultry bone of a poultry part, said apparatus comprising:
   an elongated frame defining an infeed end and a discharge end;
   an elongated conveyor supported on said frame and extending from said infeed end to said discharge end, said conveyor including means for engaging the poultry part;
   a hold-down means supported above said conveyor for holding said bone in engagement with said conveyor;
   a scraper positioned above said conveyor;
   means connected to said scraper for biasing said scraper into engagement with the meat on the bone and for controlling the force exerted by said scraper on the meat;
   water knife means supported on said frame above said conveyor for discharging a high pressure water stream onto the meat to peel the meat down from the bone; and
   a cutting assembly on said frame and positioned downstream of and below said hold-down means and said water knife means for cutting the meat from a lower edge of the bone.

2. A deboner apparatus as defined by claim 1 wherein said hold-down means comprises:
   an elongated rail including a central portion and side portions in transverse cross section, said central portion having a generally inverted V-shaped cross section to define a passage for receipt of the bone, and said side portions each being generally U-shaped in cross section, said rail retaining the bone of the poultry part on said conveyor.

3. A deboner apparatus as defined by claim 2 further including means for biasing said rail towards said conveyor.

4. A deboner apparatus as defined by claim 3 wherein said means for biasing said rail includes:
   linkage means pivoted to said frame and to said rail for supporting said rail for parallel movement towards and away from said conveyor.

5. A deboner apparatus as defined by claim 4 wherein said means for biasing said rail includes variable spring means engaging said linkage means for biasing said rail towards said conveyor.

6. A deboner apparatus as defined by claim 5 wherein said variable spring means comprises a plurality of piston cylinder actuators supported above said conveyor, each actuator including a shaft operatively connected to said linkage means.

7. A deboner apparatus as defined by claim 1 wherein said water knife means comprises:
   a support positioned above said hold-down means and said conveyor;
   a nozzle; and
   means for mounting said nozzle for movement towards and away from said support and into engagement with said poultry bone, said nozzle including an outlet and an inlet, said inlet adapted for connection to a source of high pressure water, said outlet being positioned to emit a high pressure stream of water against said poultry bone to peel the meat from said bone.

8. A deboner apparatus as defined by claim 7 wherein said means for mounting said nozzle comprises:
   an elongated support member having a nozzle support end and a mounting end;
   pivot means for pivoting said mounting end to said support member for movement towards and away from said hold-down means; and
   nozzle biasing means operatively connected to said support member for biasing said nozzle towards said hold-down means.

9. A deboner apparatus as defined by claim 8 wherein said nozzle biasing means comprises a piston cylinder actuator, said actuator having a rod connected to said support member.

10. A deboner apparatus as defined by claim 9 wherein said hold-down means comprises:
    an elongated rail including a central portion and side portions in transverse cross section, said central portion having a generally inverted V-shaped cross section to define a passage for receipt of the bone, and said side portions each being generally U-shaped in cross section, said rail retaining the bone of the poultry part on said conveyor.

11. A deboner apparatus as defined by claim 10 further including means for biasing said rail towards said conveyor.

12. A deboner apparatus as defined by claim 11 wherein said means for biasing said rail includes:
    linkage means pivoted to said frame and to said rail for supporting said rail for parallel movement towards and away from said conveyor.

13. A deboner apparatus as defined by claim 12 wherein said means for biasing said rail includes variable spring means engaging said linkage means for biasing said rail towards said conveyor.

14. A deboner apparatus as defined by claim 13 wherein said variable spring means comprises a plurality of double-acting piston cylinder actuators supported above said conveyor, each actuator including a shaft operatively connected to said linkage means.

15. A deboner apparatus as defined by claim 1 further including:
    a peel-down assembly positioned downstream of said hold-down means, said peel-down assembly including plate means for defining an elongated slot having edges positioned at an angle with respect to said conveyor so that as the poultry bone passes through the slot, the edges of the slot progressively pass along a side of the bone of the poultry part to peel the meat until the meat is retained on the bone along a lower edge of the bone, said cutting assembly being positioned downstream of said peel-down assembly.

16. A deboner apparatus as defined by claim 15 wherein said cutting assembly comprises:
    a pair of elongated, spaced ramp plates defining an elongated guide slot having a ramped entrance end; and
    a rotary cutting blade positioned to overlie said guide slot and to rotate along the lower edge of the bone to cut the meat therefrom.

17. A deboner apparatus as defined by claim 3 further including:
    a peel-down assembly positioned downstream of said hold-down means, said peel-down assembly including plate means for defining an elongated slot having edges positioned at an angle with respect to said conveyor so that as the poultry bone passes through the slot, the edges of the slot progressively pass along a side of the bone of the poultry part to peel the meat until the meat is retained on the bone along a lower edge of the bone, said cutting assembly being positioned downstream of said peel-down assembly.

18. A deboner apparatus as defined by claim 17 wherein said cutting assembly comprises:
    a pair of elongated, spaced ramp plates defining an elongated guide slot having a ramped entrance end; and
    a rotary cutting blade positioned to overlie said guide slot and to rotate along the lower edge of the bone to cut the meat therefrom.

19. A deboner apparatus as defined by claim 14 further including:
    a peel-down assembly positioned downstream of said hold-down means, said peel-down assembly including a plate defining an elongated slot positioned at an angle with respect to said conveyor so that as the poultry bone passes through the slot, edges of the slot progressively pass along a side of the bone of the poultry part to peel the meat until the meat is retained on the bone along a lower edge of the bone, said cutting assembly being positioned downstream of said peel-down assembly.

20. A deboner apparatus as defined by claim 18 wherein said cutting assembly comprises:
    a pair of elongated, spaced ramp plates defining an elongated guide slot having a ramped entrance end; and
    a rotary cutting blade positioned to overlie said guide slot and to rotate along the lower edge of the bone to cut the meat therefrom.

21. A deboner apparatus as defined by claim 8 further including:
    a peel-down assembly positioned downstream of said hold-down means, said peel-down assembly including plate means for defining an elongated slot positioned at an angle with respect to said conveyor so that as the poultry bone passes through the slot, edges of the slot progressively pass along a side of the bone of the poultry part to peel the meat until the meat is retained on the bone along a lower edge of the bone, said cutting assembly being positioned downstream of said peel-down assembly.

22. A deboner apparatus as defined by claim 21 wherein said cutting assembly comprises:
    a pair of elongated, spaced guide plates defining an elongated guide slot having a ramped entrance end; and
    a rotary cutting blade positioned to overlie said guide slot and to rotate along the lower edge of the bone to cut the meat therefrom.

23. A deboner apparatus as defined by claim 14 further including:
a peel-down assembly positioned downstream of said hold-down means, said peel-down assembly including plate means for defining an elongated slot positioned at an angle with respect to said conveyor so that as the poultry bone passes through the slot, edges of the slot progressively pass along a side of the bone of a poultry part to peel the meat until the meat is retained on the bone along a lower edge of the bone, said cutting assembly being positioned downstream of said peel-down assembly.

24. A deboner apparatus as defined by claim 23 wherein said cutting assembly comprises:
a pair of elongated, spaced ramp plates defining an elongated guide slot having a ramped entrance end; and
a rotary cutting blade positioned to overlie said guide slot and to rotate along the lower edge of the bone to cut the meat therefrom.

25. An apparatus for removing meat from an elongated poultry bone, said apparatus comprising:
an elongated frame;
a conveyor extending longitudinally along said frame;
a housing having an edge pivoted to said frame, said housing being movable from a closed, operative position to an open, service position;
an elongated hold-down rail defining a generally inverted V-shaped passage;
linkage means secured to said housing for supporting said rail for parallel, vertical movement towards and away from said conveyor;
biasing means operatively engaging said linkage means for biasing said rail in a controllable manner towards said conveyor; and
a scraper and water knife assembly supported on said housing and including a scraper means for scraping the meat and bone and a nozzle for emitting a high pressure stream of water against the bone.

26. An apparatus as defined by claim 25 further comprising:
a final peel-down means supported by said housing for engaging lateral sides of the bone and wiping the meat from the lateral sides of the bone.

27. An apparatus as defined by claim 26 further comprising:
a cutting means supported on said housing for cutting the meat from a lower longitudinal edge of the bone after it passes through the final peel-down means.

28. An apparatus as defined by claim 27 wherein said hold-down rail includes an upwardly angled leading portion.

29. An apparatus as defined by claim 25 wherein said biasing means engaging said linkage means includes a plurality of piston/cylinder actuators mounted on said housing, each actuator having a rod operatively engaging said linkage means.

30. An apparatus as defined by claim 29 wherein said hold-down rail further includes a pair of longitudinally spaced support rods, said rods extending through said housing and including stops to limit vertical movement of said rails towards said conveyor.

31. An apparatus as defined by claim 25 wherein said scraper means includes:

a support member mounted on said housing;
a scraper link pivoted to said support member;
a scraper blade mounted on a free end of said scraper link, said hold-down rail defining an opening through which said blade may extend; and
actuator means on said support member and connected to said scraper link for moving said scraper into engagement with the bone through said opening and for controlling the pressure said scraper exerts on the bone.

32. An apparatus as defined by claim 31 wherein said scraper and water knife assembly further includes:
a knife link pivoted to said support member and spaced longitudinally downstream of said scraper link;
said nozzle being supported on said knife link, said hold-down rail defining another opening through which said nozzle may extend; and
knife actuator means on said support member and connected to said knife link for moving said nozzle towards said bone through said another opening and for controlling the pressure said nozzle exerts on said bone.

33. An apparatus as defined by claim 30 wherein said scraper includes;
a support member mounted on said housing;
a scraper link pivoted to said support member;
a scraper blade mounted on a free end of said scraper link, said hold-down rail defining an opening through which said blade may extend; and
actuator means on said support member and connected to said scraper link for moving said scraper into engagement with the bone through said opening and for controlling the pressure said scraper exerts on the bone.

34. An apparatus as defined by claim 33 wherein said scraper and water knife assembly further includes:
a knife ilnk pivoted to said supprot member and spaced longitudinally downstream of said scraper link;
said nozzle being supported on said knife link, said hold-down rail defining another opening through which said nozzle may extend; and
knife actuator means on said support member and connected to said knife link for moving said nozzle towards said bone through said another opening and for controlling the pressure said nozzle exerts on said bone.

35. An apparatus as defined by claim 26 wherein said final peel-down means includes a leading edge portion pivoted to a trailing end of said hold-down rail.

36. An apparatus as defined by claim 34 further comprising:
a final peel-down means supported by said housing for engaging lateral sides of the bone and wiping the meat from the sides of the bone.

37. An apparatus as defined by claim 36 further comprising:
a cutting means supported on said housing for cutting the meat from a lower longitudinal edge of the bone after it passes through the final peel-down means.

38. An apparatus as defined by claim 37 wherein said final peel-down means includes a leading edge portion pivoted to a trailing end of said hold-down rail.

* * * * *

UNITED STATES PATENT AND TRADEMARK OFFICE
CERTIFICATE OF CORRECTION

PATENT NO. : 4,639,972

DATED : February 3, 1987

INVENTOR(S) : Eugene G. Martin et al

It is certified that error appears in the above-identified patent and that said Letters Patent is hereby corrected as shown below:

Column 1, line 32:

"fro" should be --for--;

Column 1, line 37:

"patetn" should be --patent--;

Column 1, line 58:

"th ebone" should be --the bone--;

Column 6, line 45:

"cros" should be --cross--;

Column 6, line 54:

"support 256" should be --support 236--;

Column 7, line 24:

"grovoe" should be --groove--;

Column 10, line 41:

"claim 18" should be --claim 19--; and

UNITED STATES PATENT AND TRADEMARK OFFICE
CERTIFICATE OF CORRECTION

PATENT NO. : 4,639,972

DATED : February 3, 1987

INVENTOR(S) : Eugene G. Martin et al

It is certified that error appears in the above-identified patent and that said Letters Patent is hereby corrected as shown below:

Column 12, line 25:
    after "scraper" insert --means--.

Signed and Sealed this

Eleventh Day of August, 1987

*Attest:*

DONALD J. QUIGG

*Attesting Officer*     Commissioner of Patents and Trademarks